United States Patent

Overbeck

[11] Patent Number: 5,837,962
[45] Date of Patent: Nov. 17, 1998

[54] FASTER LASER MARKER EMPLOYING ACOUSTO-OPTIC DEFLECTION

[76] Inventor: James W. Overbeck, 112 Martins La., Hingham, Mass. 02043

[21] Appl. No.: 680,484

[22] Filed: Jul. 15, 1996

[51] Int. Cl.⁶ .................................................. B23K 26/08
[52] U.S. Cl. .................................. 219/121.68; 219/121.6; 219/121.75; 219/121.79; 347/259
[58] Field of Search .......................... 219/121.68, 121.69, 219/121.78, 121.79, 121.8, 121.81, 121.82, 121.73, 121.74, 121.75, 121.6; 359/196, 225, 285, 305; 347/224, 225, 259, 260; 346/107.3, 107.4, 107.5

[56] References Cited

U.S. PATENT DOCUMENTS

| | | | |
|---|---|---|---|
| 3,746,427 | 7/1973 | Foster | 359/305 |
| 3,962,688 | 6/1976 | Westerberg . | |
| 4,164,717 | 8/1979 | Blazey | 359/286 |
| 4,180,822 | 12/1979 | Hudson et al. . | |
| 4,193,087 | 3/1980 | Altman | 358/479 |
| 4,272,151 | 6/1981 | Balasubramanian | 347/260 |
| 4,401,886 | 8/1983 | Pond et al. | 250/203.1 |
| 4,532,402 | 7/1985 | Overbeck | 219/121.6 |
| 4,725,709 | 2/1988 | Mattelin | 219/121.8 |
| 4,872,746 | 10/1989 | Kobayashi | 359/305 |
| 5,110,195 | 5/1992 | Loney | 359/224 |
| 5,121,247 | 6/1992 | Fujita et al. | 359/305 |
| 5,268,554 | 12/1993 | Ream | 219/121.8 |
| 5,274,492 | 12/1993 | Razzaghi | 359/202 |
| 5,416,298 | 5/1995 | Roberts | 219/121.68 |
| 5,430,509 | 7/1995 | Kobayashi | 351/221 |
| 5,653,900 | 8/1997 | Clement et al. | 219/121.68 |

FOREIGN PATENT DOCUMENTS

| | | |
|---|---|---|
| 0615721A1 | 9/1994 | European Pat. Off. . |
| 0620468A1 | 10/1994 | European Pat. Off. . |
| 57-47593 | 3/1982 | Japan ................................ 219/121.82 |
| 60-40682 | 3/1985 | Japan ................................ 219/121.68 |
| 3-198988 | 8/1991 | Japan ................................ 219/121.68 |
| 7-116869 | 5/1995 | Japan . |
| 2133352 | 7/1984 | United Kingdom . |

OTHER PUBLICATIONS

*Design and Fabrication of Acousto–Optic Devices*, Ed. Goutoulis, A.P. et al. 1994, Marcel Dekker, NY.
*Optical Scanning*, Ed. Marshall, G.F., 1991,Marcel Dekker, NY.
Letter from Arthur French to Julia P. Farrell, Mar. 22,1996.
"Using Laser to Mark Identification Data on Silicon Wafers",by James H. Scaroni, Microelectronics Manufacturing & Testing Magazine, Apr. 1982.
"Ray Marker" data sheet, International Laser Machines Corporation, No Date Available.
"LightWriter XL and XLe", data sheet, Lumonics Marking Corp., No Date Available.

*Primary Examiner*—Gregory Mills
*Attorney, Agent, or Firm*—Fish & Richardson

[57] ABSTRACT

By adding an acousto-optic deflector to an existing design of laser marker the laser marker's throughput is increased by a large factor, typically a factor of 5. Galvanometer driven mirrors, which in existing laser markers are used to trace out the strokes in characters are, in this invention, used only to scan smoothly along lines of characters. The acousto-optic deflector, being much faster than the galvanometers, is used to trace out the individual strokes in the characters. Marking rates of 1000 characters per second are achieved in the case of characters for which capital letters are 2 millimeters high and a 2 millimeter long stroke contains 13 laser-produced craters. This performance is achieved over fields as large as 300 millimeters square. The quality of marked characters is improved because the deleterious effects of mirror inertia on character quality, commonly seen when a laser marker is pushed for speed, are eliminated.

28 Claims, 6 Drawing Sheets

Microfiche Appendix Included
(1 Microfiche, 62 Pages)

FASTER LASER MARKER EMPLOYING ACOUSTO-OPTIC DEFLECTION

MICROFICHE APPENDIX

There is a microfiche appendix containing computer listings and sample computer outputs. It consists of one fiche containing 62 frames on 1 sheet.

FIELDS OF THE INVENTION

The fields of this invention are: laser beam positioning for applications in which material is modified by the laser beam, and laser marking in particular.

PRIOR ART IN LASER BEAM POSITIONING

Acousto-optic deflectors are commonly used to deflect laser beams in a direction perpendicular to the axis of rotation of rotating mirrors such as polygons. An example of this is described in U.S. Pat. No. 4,180,822, issued to Hudson and Herzog. In U.S. Pat. No. 5,416,298, issued to Roberts, the laser beam motion provided by an acousto-optic deflector is combined with the motion of a workpiece. For both of these applications the acousto-optic deflection occurs only in one dimension. The implementation of acousto-optic deflection in one dimension is much easier than in two dimensions.

In U.S. Pat. Nos. 3,962,688, issued to Westerberg, 4,401,886 issued to Pond and Wilbert, and 5,430,509, issued to Kobayashi, an acousto-optic deflector is used in series with a moving mirror or mirrors in order to achieve one of the objects of the present invention, to move the laser beam over a small angular range at very high speed, yet cover a larger angular range with moving mirrors, which are slower than acousto-optic deflectors.

None of these would be effective or competitive with the present invention for the task of laser marking, for the following reasons:

U.S. Pat. No. 5,416,298 describes an airborne laser radar. It uses acousto-optic deflection in two dimensions and mirror deflection in two dimensions, similar to the present invention. In addition to lacking the high power laser and objective lens for laser marking, it lacks means for eliminating the laser light which passes through the acousto-optic deflector without deflection. In the case of laser marking, where high efficiency in use of laser light is important and where retention of as large as possible angular range for the acousto-optic deflector is also important, the optics surrounding the acousto-optic elements and the means for eliminating the undiffracted light are non-trivial, but U.S. Pat. No. 5,416,298 is silent on these issues. When these issues are important it is also necessary that the acousto-optic deflector act on the laser beam prior to the moving mirrors, while U.S. Pat. No. 5,416,298 treats the order in which the two methods of deflection are used as unimportant.

U.S. Pat. No. 3,962,688 describes an optical disk memory and uses the acousto-optic element for both a fine spatial adjustment of laser beam position and amplitude modulation of the laser beam. It also does not address the issues of maximizing efficiency and maximizing angular range. The first of these, and the elimination of undiffracted light, are relatively trivial for the case of one-dimensional acousto-optic deflection, as used in this patent. This patent teaches a use of acousto-optic deflection which does not naturally extend from one dimensions to two, similar to the use of acousto-optic deflectors with rotating polygons.

U.S. Pat. No. 5,416,298 describes a laser engraver for rotating drums such as are used in rotogravure printing. In this patent the rotation of the drum during engraving plays such an important role that an application of this patent to a stationary workpiece is non-obvious. It essentially uses only one dimension of acousto-optic deflection, and therefore is inapplicable to laser marking in the same way as U.S. Pat. No. 3,962,688. The angular range provided by the acousto-optic deflector is also so limited that the acousto-optic deflector alone could not be used for delineating whole characters.

U.S. Pat. No. 5,430,509 describes an instrument for scanning the eye fundus at a higher rate than can be achieved reliably with moving mirrors alone. It is similar to the laser radar of U.S. Pat. No. 5,416,298 in many ways. It does have provision for elimination of undiffracted laser light which the laser radar lacks. However in doing so it restricts the ratio of angular range of acousto-optic deflection to diameter of the focused laser spot, and makes it non-competitive as a laser marker even after other changes are made. It also is similar to a television picture tube in that it lacks the agility, or high speed random access positioning capability, required for laser marking.

U.S. Pat. No. 4,532,402, issued to the present author, describes a laser micro-machining system which uses both slowly moving mirrors mounted on an x-y stage and higher speed mirrors rotating on galvanometers. Its speed over a small range of motion is much faster than its speed over a large range, but its highest speed is much too low to be competitive with the present invention.

General observations about extrapolating the prior use acousto-optic deflectors to laser marking are:

(a) The angular range of acousto-optic deflectors appears to be too small to be useful for delineating entire characters, primarily because of the difficulty of designing the optics to transfer light efficiently between two one-dimensional acousto-optic deflectors and between the second such deflector and a pair of moving mirrors. If one could cover only a small fraction of a character with acousto-optic deflection the present invention would lose much of its economic advantage.

(b) The efficiency of acousto-optic deflectors appears to be too low for laser marking, because of losses in light transfer described above, and because of the inherent low efficiency of the deflectors themselves when one either desires a large deflection range or requires two dimensions of deflection from a single acousto-optic device. When using the present invention he speed of laser marking becomes limited by laser power rather than by the speed of laser beam positioning. However this implies that a loss of laser power through low acousto-optic efficiency is just as economically damaging as a loss of positioning speed.

An additional reason for the prior lack of use of acousto-optic deflectors for laser marking is that laser marker development has focused on faster mirror mechanisms and faster electronics and more sophisticated software to drive them.

Acousto-optic deflection hardware adds significant cost to a laser marker. Quantitative calculations of the throughput improvement due to the present invention had not been performed, but if they had been performed it would have been immediately observed that the additional hardware cost is more than justified by the large increase in throughput of the laser marker.

The usefulness of acousto-optic deflection in laser marking is also surprising because the field covered by acousto-optic deflection, typically 4 millimeters square in the present invention, is still very small compared with the typically 300 millimeter square field covered by moving mirrors. Designers of the original laser markers did not anticipate that one would be marking characters as small as 2 millimeters over such large fields as 300 millimeters.

PRIOR ART IN LASER MARKING

Laser markers using all of the components shown in FIG. 1, with the exception of the two-dimensional acousto-optic deflector 5 and components 111, 112, 129, 130, and 131, have been in use since 1976. These markers are used to mark serial numbers, brand identification, logotypes, etc. on a variety of workpieces including silicon wafers, automotive parts, parts to be implanted in the human body, and even meat and cheese. Q-switched lasers, which produce short pulses at high repetition rates, are used in almost all cases, because the short pulses enable one to achieve enough heating of the workpiece to melt, vaporize, or induce chemical changes in it. The article "Using Lasers to Mark Identification Data on Silicon Wafers", listed among the references, provides a good summary of laser marking.

Laser markers are much more expensive than equipment which uses printing ink for marking, for example, so there has been continual pressure to make laser markers more productive, i.e., faster. Making the mirror mechanisms (items 6 through 9 in FIG. 1) faster and making lasers more powerful and capable of more pulses per second have been the primary approaches to making laser markers faster.

The importance of making the mirror mechanisms faster is illustrated in FIG. 2, where the path of the laser beam on the workpiece is shown. The circles in FIG. 2 show the locations where laser pulses modify the workpiece. The crosses in FIG. 2 show the location of the laser beam when it is in transit, or slewing, between the end of one stroke of a character and the beginning of the next. The spacing between the crosses corresponds to the same time interval as the time between the circles. The fraction of time that the laser marker is unproductive is therefore given by the ratio of the number of crosses to the number of crosses plus circles, which is seen to be large.

The reasons for the unproductive time are the inertia of the mirror mechanisms, the finite bandwidth of the servos which control them, and the internal compliance of the mirror mechanisms, which is the root cause of the finite bandwidth.

The characters in FIG. 2 are perfectly formed, however actual characters made by laser markers pushed to the limit of their speed are deformed. Therefore actual laser markers typically operate at as little as one fifth of the speed made possible by this invention.

FIG. 1 and the claims point out the essential features of a laser marker from the point of view of this invention. However laser markers also normally include parts handlers, protective enclosures, a computer, computer software for interfacing with an operator, computer software for other purposes, etc. As time progresses improved lasers, methods of coupling power from the laser head, mirror mechanisms, mirrors, computers, computer software, parts handlers, enclosures, lenses, etc. will be added to laser markers, a process which the present writer believes to be obvious.

There are a few improvements which are not commonly present in laser markers or perhaps not present at all, which are mentioned in the claims and in the following description because there are synergistic effects between them and the speed improvements which are the primary objects of this invention. These improvements are automated control over spot size, laser power, and focus.

Two comments of minor importance with regard to FIG. 1 follow: The mirrors 3 and 4 are provided in the figure in order to fit components 1 and 2 into a reasonably sized drawing. In an actual laser marker they, or more such mirrors, are provided in order to make the components fit into various enclosures and parts handlers. Mirrors 3 and 4 should not be confused with any of the mirrors mentioned in the claims. The first beam expander 2 is so named because in most applications of this invention there will be a second beam expander, shown as lenses 111 and 112 in FIG. 1. This second beam expander is referred to in the claims as a second substantially afocal optical element, because it may actually decrease the diameter of the laser beam rather than expand it.

The purposes of the first, and usually only, beam expander in an existing laser marker are: (a) to allow a long distance between laser head and galvos without concern about further expansion of the laser beam over this distance, (b) to reduce the laser power density on mirror surfaces, and (c) to control the spot size of the laser beam on the workpiece. In this invention there is an additional purpose, which is to make the laser beam diameter match the length of the sound column in an acousto-optic deflector.

SUMMARY OF THE INVENTION

By adding an acousto-optic deflector to an existing design of laser marker the laser marker's throughput is increased by a large factor, typically a factor of 5. Galvanometer driven mirrors, which in existing laser markers are used to trace out the strokes in characters are, in this invention, used only to scan smoothly along lines of characters. The acousto-optic deflector, being much faster than the galvanometers, is used to trace out the individual strokes in the characters.

The acousto-optic deflector moves the laser beam over a small angular range more rapidly than the inertia of moving mirrors would permit, and the galvanometer driven mirrors, retained in this invention, provide movement of the laser beam over a larger angular range than that provided by acousto-optic deflectors.

OBJECTS AND ADVANTAGES

The primary object of this invention is to provide much greater speed of laser marking than has been previously achieved. An example given in the microfiche appendix shows the ability to mark 1000 characters per second when the capital lettters in the characters are 2 millimeters high and a when 2 millimeter long stroke contains 13 laser-produced craters.

A secondary objective is to improve the quality, or visual appearance, of laser marked characters. When existing laser markers are pushed for maximum speed the inertia of their moving mirrors causes the marked characters to be deformed. This invention does not suffer from this problem since the acousto-optic deflector which it uses provides essentially instantaneous movement of the laser beam.

Other objectives are: (a) to limit the cost of implementation of the invention; (b) to have it be manufacturable from readily available components; (c) to provide automation of such properties as laser power, focus, and laser spot size; and (d) to minimize the requirements for precision, adjustments, or skill in manufacturing the invention.

DESCRIPTION OF THE PREFERRED EMBODIMENTS

I. Optics

Figure 1:
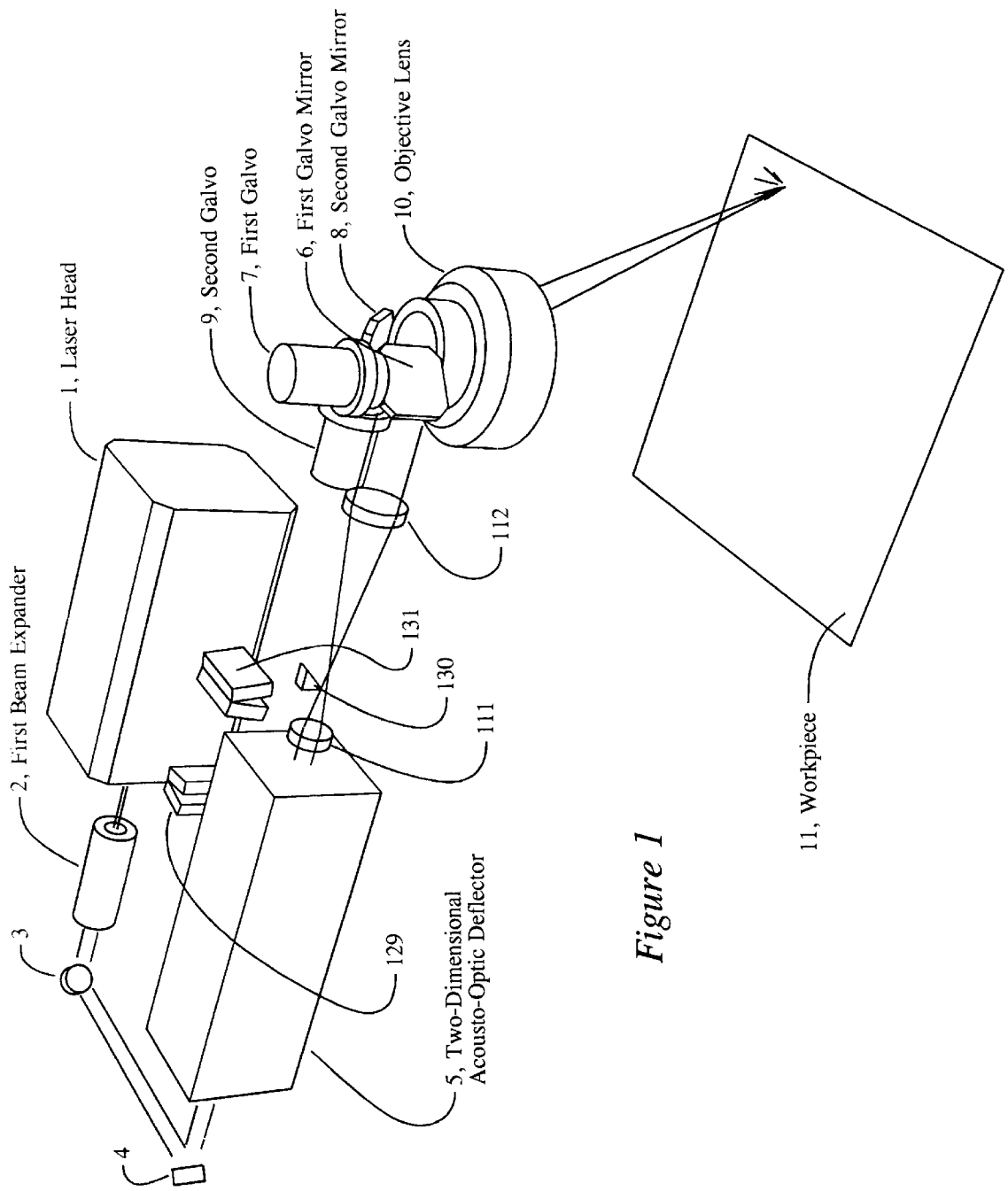
FIG. 1 shows the relation of the invention to the parts of existing laser markers, omitting details which are shown in FIG. 3.
Figure 2:
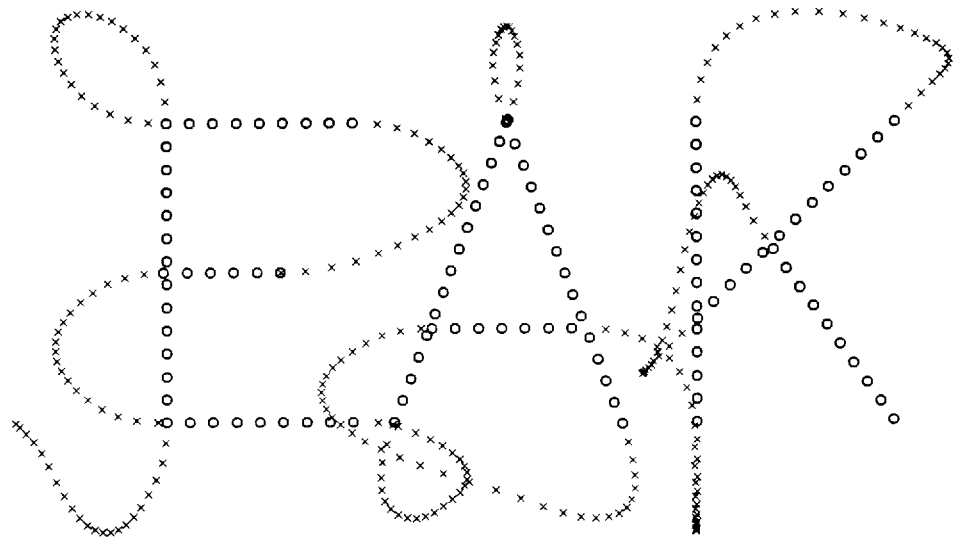
FIG. 2 shows the path of the laser beam, in existing laser markers, when marking characters.
Figure 3:
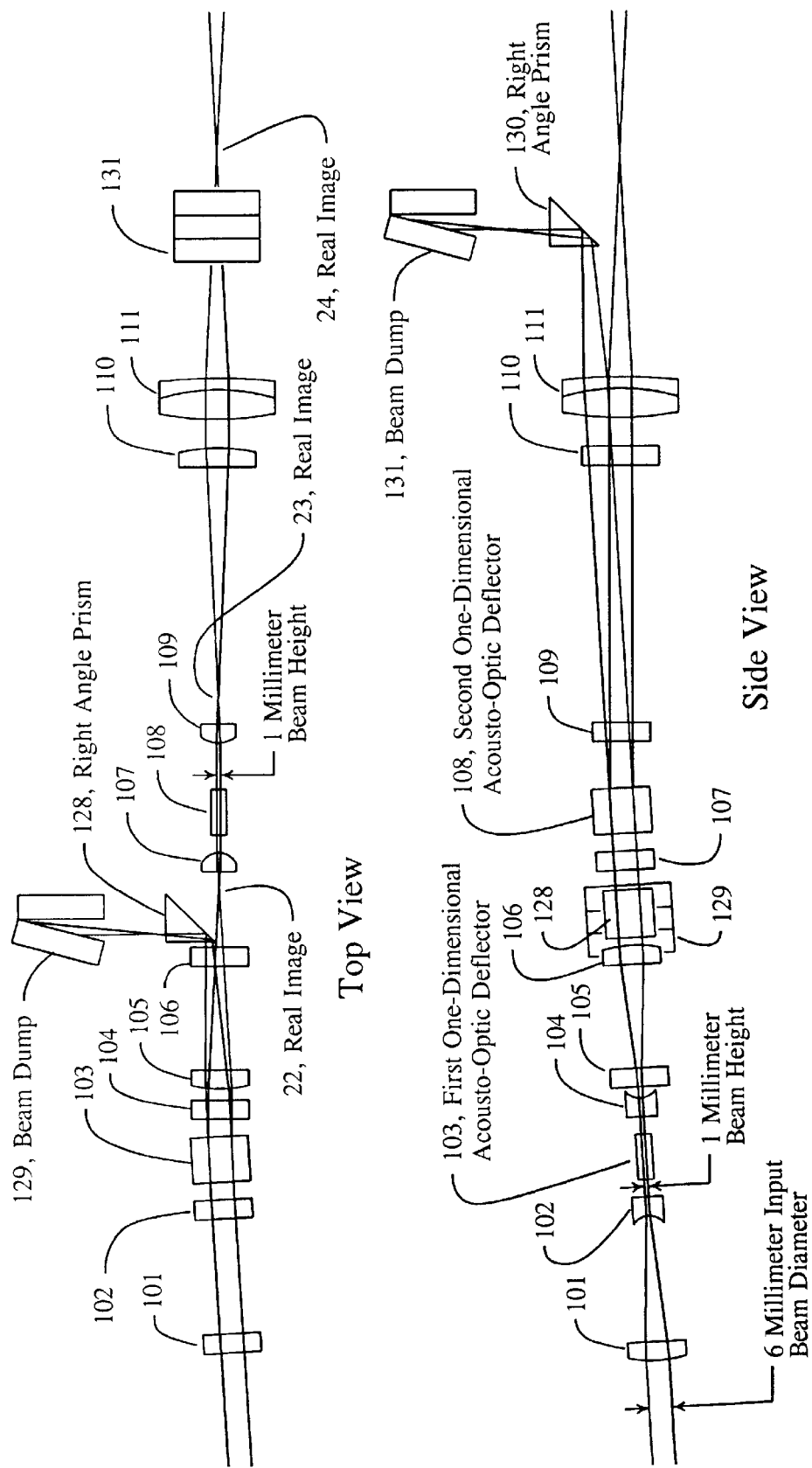
FIG. 3 shows top and side views of the two-dimensional acousto-optic deflector, when implemented as two one-dimensional deflectors in series.

The embodiment described here in detail implements the two-dimensional acousto-optic deflector 5, of FIG. 1, as two one-dimensional acousto-optic deflectors 103 and 108, in FIG. 3, in series. A monolithic two-dimensional acousto-optic deflector 30, shown in FIG. 5, would have been preferable since it would obviate the complex optics about to be described, but I was unable to find one with acceptably high diffraction efficiency. The term "high diffraction efficiency," as used here and in the claims, means that greater than about 70% of the laser light entering the two-dimensional acousto-optic deflector is deflected in the desired direction. High diffraction efficiency is important in this invention because this invention enables a laser marker's throughput to no longer be limited by laser beam positioning speed. Instead it becomes limited by laser power. Laser markers now typically use the highest power q-switched fundamental mode Yag lasers available, and such lasers are the most costly component in a laser marker. Therefore low diffraction efficiency would negatively impact both cost and throughput.

A feature of this invention, the application of RF power to an acousto-optic deflector for much less than 100% of the total time, may help to make future construction of acceptable monolithic two-dimensional acousto-optic deflectors possible. The physics of acousto-optic deflectors and practical details of their construction and use are described in the book Design and Fabrication of Acousto-Optic Devices, listed in the references.

The optical design to be described was intended to accommodate two different types of readily available, reasonably priced one-dimensional acousto-optical deflectors, hereafter referred to as AODs. The first type, which uses compressional sound waves in a transparent lead molybdate ($PbMoO_4$) block, is typified by the Isomet 1705C-2. The speed of the compressional sound waves is 3630 meters per second, the center frequency of the sound waves is 80 MHz, and the the range of frequency for which diffraction efficiency is deemed to be acceptable high is 20 MHz. Deflection angle increases linearly with frequency, and the range of deflection angles corresponding to 20 MHz is 5.86 milliradians. This type of AOD is relatively insensitive to the polarization of the incident laser light, and the diffracted light has the same polarization as the input light.

The second type of AOD uses shear sound waves in a transparent block of tellurium dioxide ($TeO_2$). The speed of the shear waves is 670 meters per second, the center frequency is 35 MHz, and the range of frequencies is 20 MHz. The range of deflection angles corresponding to 20 MHz is 15.9 milliradians. This type of AOD, in addition to using the Bragg reflection principle used in all practical AODs, also uses the principle of phase matching of the incident and diffracted light. This is made possible by the birefringence of $TeO_2$ and by the diffracted light having polarization different from that of the incident light. For more details the reader is referred to the book cited above.

The linear dimension of the field covered by varying AOD deflection angle is X=above range of deflection angles times the focal length of the objective lens 10 times the ratio of the beam width in the deflection plane at the AODs (6 millimeters) to its width W at the objective lens. In this embodiment the focal length is 460 millimeters and the latter ratio is variable between 1.65 and 0.6464. These numbers are, of course, not to be interpreted as limitations of the invention. The quantity X is referred to in this document as the "AOD field", neglecting the fact that it may differ between the two axes, and that the area covered by the AODs is the product of X for one axis and X for the other axis.

Both AODs produce a sound field which is about 10 millimeters long in the direction of sound propagation, and about 10 millimeters wide in a nearly perpendicular direction, the direction of propagation of the incident laser light. The ratio of AOD field size X to spot size w, commonly referred to as the "number of spots" produced by the AOD, is proportional to the first of these distances and acceptable diffraction efficiency is achieved by proper choice of the second of these distances. The direction perpendicular to both of the first two directions, referred to as "height" in this document, is relatively unimportant for one-dimensional acousto-optic deflection. Therefore making the width of the sound field in the third direction small reduces cost and power dissipation, and makes it easier to enlarge the other two dimensions.

For the above reasons both AODs require that the input laser beam be only about 1 millimeter high in the direction perpendicular to the plane in which deflection occurs. Achieving the desired AOD field size X requires that the beam width in the plane of deflection be about 6 millimeters. 6 millimeters is a compromise value that enables one set of optical elements to serve either AOD. Note that throughout this document a mention of beam height, width or spot size always refers to the distance between two points at which the laser power density has dropped to $1/e^2=0.135335$ times its value at the center of the beam or spot.

The AODs therefore require an input beam with an elliptical cross section of 1 by 6 millimeters. Since the two AODs serve perpendicular deflection axes the incoming circular cross section laser beam must be transformed first into an elliptical beam with the ellipse oriented in one direction, then to an ellipse oriented in the perpendicular direction, and finally back into a circular cross section beam so as to produce a circular cross section spot on the workpiece. This task is sufficiently complex and potentially costly to deter people from using AODs for two-dimensional beam positioning.

The task is made more demanding by two additional considerations. First, in applications such as laser marking, the undiffracted light must be separated from the diffracted light and eliminated before it hits the workpiece and creates a visible mark. Second, unless the optical design specifically addresses it, the diffracted light from the first AOD will move outside the narrow 1 millimeter height of the second AOD as the first AOD's deflection angle is varied.

With a phase matched $TeO_2$ AOD one can remove the undiffracted light with a polarization analyzer, but polarization analyzers with acceptable optical quality and power handling capability are expensive. With both types of AOD it is common to separate the diffracted and undiffracted beams spatially, making use of the difference in direction of the two beams. In many applications this requires no components, only sufficient distance d that the product of d and the diffraction angle is greater than the width W of both (collimated) diffracted and undiffracted beams. Note that at this distance the diffracted beam moves an amount d times the range of deflection angles. This effect, when examined quantitatively for this application, makes it impossible to get the laser beam from the first AOD through the second AOD or from the second AOD to reasonably sized galvo mirrors and objective lens.

Instead, in this invention, lenses are used which form real images 22 and 24, whose positions are indicated in FIG. 3. FIG. 3 also calls out another real image 23, solely to prevent confusion between it and 22 and 24. Right angle prisms 128 and 130, referred to as mirror means in claims 3, 4, 16, and 17, are located near the real images and reflect the undiffracted light into beam dumps 129 and 131. These are shown primarily in FIG. 3, but also in FIGS. 1, 4, and 5. The right angle prisms are placed in such positions that they do not intercept the real images in the diffracted light beam as these images move with changing deflection angle. They are also placed so that the laser beam is not focused on a surface.

Right angle prisms possess the following advantages over other types of mirrors although other types of mirrors could be used. Right angle prisms need not have absorbing coatings which would be damaged by the laser beam. They also are routinely fabricated so that a high quality reflecting surface is available very near the edge of the prism, and they are inexpensive. Alternatively, one might be able to dispense with mirrors entirely in favor of an absorbing surface. It would take great care in material selection and in placement of the absorbers to be sure that they are not eroded by the laser beam. The surfaces in the beam dumps 129 and 131 are at an acute angle to the laser beam and are placed at such a distance from the focal point that the power density on them is low. Aluminum is a suitable material for them.

The optical system shown in FIG. 3 is described in detail as follows:

Cylinder lenses 101 and 102 form a Galilean telescope which reduces the beam width from 6 to 1 millimeters in the narrow, or "height" direction of the first AOD, i.e., in the plane perpendicular to the plane in which deflection by the first AOD occurs. In general terms the combination of lenses 101 and 102 would be referred to as a substantially afocal anamorphic optical element. Combinations of cylinder lenses are referred to as anamorphic optical elements in claims 2 and 15 so as not to restrict the specific way in which the beam width is compressed and enlarged in only one of two dimensions. Prisms, for example, are sometimes used in place of lenses for this purpose.

FIG. 3 shows that after leaving lens 102 the laser beam passes through the first one-dimensional acousto-optic deflector 103. Emerging from this deflector are two beams, the undiffracted beam and the diffracted beam, as shown in the top view of FIG. 3. The undiffracted beam strikes the right angle prism 128 while the diffracted beam passes on to lens 107.

Lens 102's being a negative lens provides compensation for the spherical aberration of lens 101, an important consideration in this application because there are a large number of optical elements which contribute aberrations. These aberrations in most cases cannot be compensated as they are in the case of lenses 101 and 102. Lenses 104 and 106 are identical to lenses 101 and 102 except their order is reversed. They undo the beam height reduction done by lenses 101 and 102. The spacing between lenses 104 and 106 is slightly greater than that between lenses 101 and 102 in order to compensate for the presence of lens 105 between lenses 104 and 106.

The lens spacings, radii, and indices of refraction are tabulated in a conventional way in Table 1, so a person skilled in the optical art could fill in all the relevant details missing from this verbal description.

Lenses 105 and 107 form a Keplerian telescope which accomplishes the same function for the second one-dimensional acousto-optic deflector 108 as lenses 101 and 102 accomplish for the first, reduction of beam height in the narrow dimension of the AOD by a factor of 6. Lens 107, unlike lens 102, is positive for two reasons: (a) to allow the real image 22 to be formed, and (b) so that lenses 105 and 107 approximately focus the first AOD 103 on the second AOD 108. This results in the motion of the laser beam at the second AOD, as the first AOD's deflection angle is varied, being much less than it otherwise would be. Even so, the motion is such as to limit the usable angular range of the first AOD, and therefore the size of the field covered by the first AOD. Decreasing the 6:1 ratio, increasing the 1 millimeter dimension of the AODs, and increasing the overall space available for the optical train would all be helpful in reducing the amount of this limitation. A monolithic two-dimensional acousto-optic deflector 30 would, of course, eliminate this problem completely.

Lenses 109 and 110, while not identical to lenses 107 and 105, undo the narrowing of the laser beam performed by lenses 107 and 105. They also form a Keplerian telescope. The beam emerging from lens 110 has been restored to its original 6 millimeter diameter circular cross section and it is collimated. Lens 109's being a positive lens helps approximately focus the pair of AODs on the galvo mirrors. This focus is "very approximate," and the degree of focusing, i.e., the reduction of beam motion at the galvo mirrors, varies as one switches between the lenses 112 through 116, as described below. The selection of lenses 109 and 110 was a best compromise among the five distinct optical systems represented by systems containing the five different lenses 112 through 116.

After leaving lens 110 the laser beam enters positive spherical lens 111, which is an off the shelf achromat, Melles Griot part number LAO135/126. The suffix /126, omitted from Table 1, specifies that the lens is antireflection coated for a wavelength of 1.06 micrometers. Right angle prism 130 is placed near the real image 24 formed by lens 111, so as to intercept the beam which was left undiffracted by AOD 108 and to allow the diffracted beam to pass.

Figure 4:
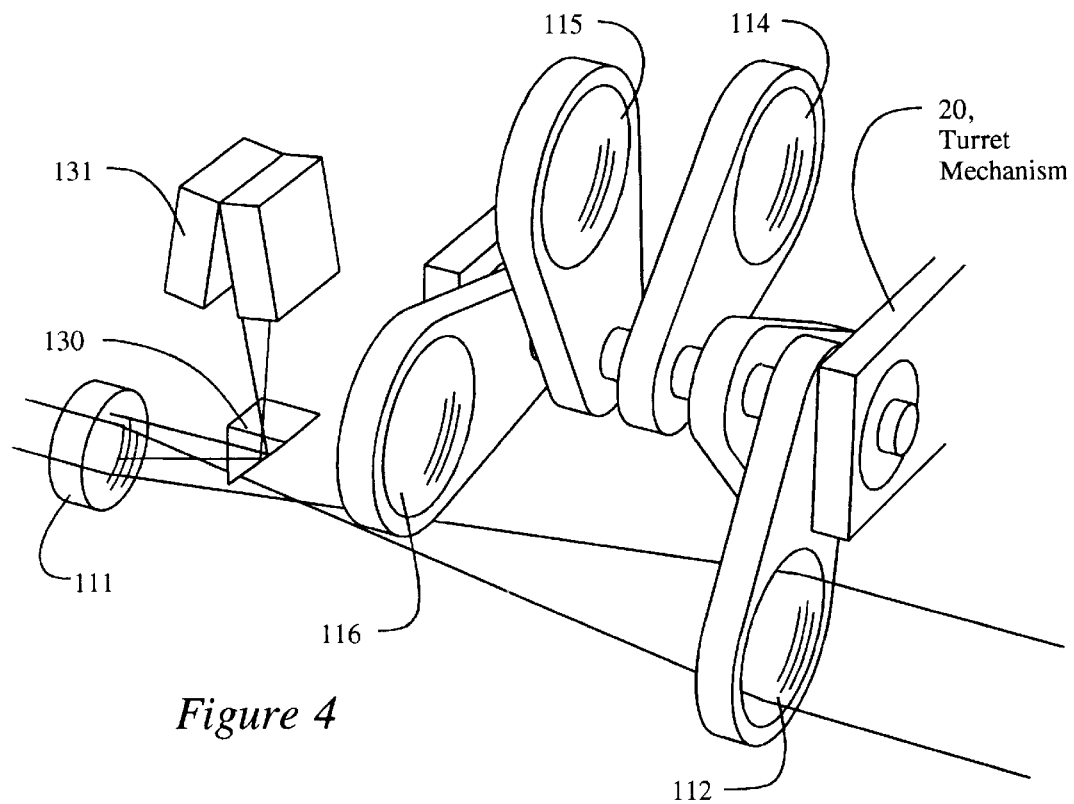
FIG. 4 shows the lenses for varying the beam expansion ratio following the acousto-optic deflector.

Lens 111 is the first element of a Keplerian telescope, referred to as the second beam expander or as the second substantially afocal optical element in claims 10, 11, 23, and 24. The second element of the Keplerian telescope is lens 112 in FIGS. 1 and 4. In addition, FIG. 4 shows the second element being variable, i. e., selected from among the set of lenses 112 through 116 in order to achieve different spot sizes and different AOD field sizes on the workpiece. The relevance of variability is discussed in a separate section on variable spot size below.

Following lens 112 or one of the lenses in the set 112 through 116 are components normally found in laser markers, namely first and second galvo mirrors 6 and 8, the first and second galvos 7 and 9, which drive them, and the objective lens 10, all of which are shown in FIG. 1. FIG. 1 shows the most common configuration, in which the galvo mirrors are followed by a large, flat field lens. For smaller field applications such as marking silicon wafers, or applications in which the workpiece surface is curved, it may be convenient to put the objective lens before the galvo mirrors. One such situation, in which the objective lens precedes the galvo mirrors, is described in a later section on variable focus and workpiece location.

The preceding discussion refers to the axes of deflection of the two AODs as being perpendicular, since that appears to be the most obvious and convenient situation. The invention would still function well if the axes differed from perpendicularity by as much as 20 or 30 degrees. The coordinate transformations performed by the computer software would only become slightly more complicated in that case.

TABLE 1

OPTICAL PRESCRIPTION
Column A: Surface Number, starting with the first curved surface after the first beam expander 2, shown in FIG. 1. The diameter of the laser beam emerging from this beam expander is assumed to be 6.0 millimeters between 1/e squared power points.
Column B: Lens or Optical Element Number if any, as shown in FIGS. 1, 3, 4, and 5, Following this Surface
Column C: Material Following this Surface
Column D: Distance in millimeters to the Next Surface
Column E: Radius of Curvature of this Surface in the Plane of Deflection of the First One-Dimensional Acousto-Optic Deflector 103, in millimeters, positive if the center of curvature is located following the surface
Column F: Radius of Curvature of this Surface in the Plane of Deflection of the Second One-Dimensional Acousto-Optic Deflector 108, in millimeters, positive if the center of curvature is located following the surface

| A | B | C | D | E | F |
|---|---|---|---|---|---|
| 1 | 101 | SF6 Optical Glass | 5.0 | infinite | 59.814 |
| 2 | | Air | 61.492 | infinite | infinite |
| 3 | 102 | SF6 Optical Glass | 5.0 | infinite | −10.058 |
| 4 | | Air | 9.0 | infinite | infinite |
| 5 | 103 | TeO$_2$ or PbMoO$_4$ | 12.0 | infinite | infinite |
| 6 | | Air | 9.0 | infinite | infinite |
| 7 | 104 | SF6 Optical Glass | 5.0 | infinite | infinite |
| 8 | | Air | 3.0 | infinite | 10.058 |
| 9 | 105 | SF6 Optical Glass | 5.0 | 59.814 | infinite |
| 10 | | Air | 55.672 | infinite | infinite |
| 11 | 106 | SF6 Optical Glass | 5.0 | infinite | infinite |
| 12 | | Air | 26.1313 | infinite | −59.814 |
| 13 | 107 | SF6 Optical Glass | 5.0 | infinite | infinite |
| 14 | | Air | 9.0 | −10.019 | infinite |
| 15 | 108 | TeO$_2$ or PbMoO$_4$ | 12.0 | infinite | infinite |
| 16 | | Air | 25.0 | infinite | infinite |
| 17 | 109 | SF6 Optical Glass | 5.0 | 15.048 | infinite |
| 18 | | Air | 130.580 | infinite | infinite |
| 19 | 110 | SF6 Optical Glass | 5.0 | infinite | infinite |
| 20 | | Air | 7.351 | −90.305 | infinite |
| 21 | 111 | BK7 Optical Glass | 7.68 | 79.65 | 79.65 |
| 22 | | SF5 Optical Glass | 3.00 | −50.53 | −50.53 |
| 23 | | Air | 314.1548 | −135.85 | −135.85 |
| 24 | 112 | SF8 Optical Glass | 3.20 | 548.68 | 548.68 |
| 25 | | SSK4 Optical Glass | 4.90 | 89.37 | 89.37 |
| 26 | | Air | 101.811 | −135.56 | −135.56 |
| 27 | 117 | Surface of First Galvanometer Mirror 6 of FIG. 1 | 35.931 | infinite | infinite |
| 28 | 118 | Surface of Second Galvanometer Mirror 8 of FIG. 1 | 42.598 | infinite | infinite |
| 29 | 119 | First Surface of Multi-Element Objective Lens 10 of FIG. 1 | | | |

Note that the optical axis of the system bends in the middle of the two acousto-optic deflectors, i.e., halfway between surfaces 5 and 6, and halfway between surfaces 15 and 16. The bending angle for a PbMoO$_4$ AOD with 80 MHz center frequency is 23.2 milliradians and the bending angle for a TeO$_2$ AOD with 35 MHz center frequency is 56 milliradians.

Note that surfaces 21 through 23 define a Melles Griot LAO 135 spherical achromat lens having focal length 121.9182 millimeters at a wavelength of 1.064 micrometers and surfaces 24 through 26 define a Melles Griot LAO189 spherical achromat lens having focal length 201.1881 millimeters at the same wavelength. The combination of these two lenses produces a laser beam diameter at the objective lens which is 1.65 times the beam diameter at surface 1.

In the preferred embodiment of the invention the beam diameter at the objective lens is varied by a mechanism which selects one of Lenses 112, 113, 114, 115, or 116. Lens 111 in combination with one of these lenses is referred to in the claims as the second substantially afocal optical element. The properties of this element are given in the table below, in which the meanings of the columns are:

Column G: Lens Number, as shown in FIGS. 1, 3, 4, and 5
Column H: Ratio of Laser Beam Diameter at the Objective Lens 10 to the Beam Diameter at Surface 1
Column I: Lens Focal Length in millimeters at a wavelength of 1.064 micrometers
Column J: Melles Griot Part Number for the Lens
Column K: Distance, in millimeters, from Surface 23 to Surface 24. Note that the distance from Surface 26 to Surface 27 changes in such a way that the distance from Surface 23 to Surface 27, 424.066 millimeters, is unchanged.
Column L: Spot size, in micrometers, between 1/e squared power points, at the workpiece when the objective lens 10 has a 460 millimeter focal length

| G | H | I | J | K | L |
|---|---|---|---|---|---|
| 112 | 1.65 | 201.1881 | LAO189 | 314.154 | 62.9 |
| 113 | 1.32 | 160.9488 | LAO149 | 274.644 | 78.7 |
| 114 | 1.00 | 121.9182 | LAO135 | 234.336 | 103.9 |
| 115 | 0.8257 | 100.6689 | LAO124 | 213.376 | 125.8 |
| 116 | 0.6464 | 78.8088 | LAO114 | 191.276 | 160.7 |

II. Variable Spot Size

In existing laser markers the size of the focused laser beam on the workpiece is seldom changed. If it is changed, this is usually accomplished by manually replacing the beam expander, i.e., the first beam expander 2, shown in FIG. 1, with a beam expander having a different expansion ratio. This relies upon the relationship between the size of the focused spot, w, and the width of the laser beam at the objective lens, W, which is $w = (4/\pi)\lambda L/W$, where $\lambda$ is the wavelength of the laser light and L is the focal length of the objective lens 10 shown in FIG. 1. Both w and W are measured between points at which the power density drops to $1/e^2 = 0.135$ times its value at the center of the beam.

In this invention, unlike existing laser markers: (a) there is a throughput advantage associated with increasing spot size, and (b) it is also easy to implement this advantage.

When spot size w is changed by changing beam diameter W the linear dimension X of the field covered by the acousto-optic deflector is simultaneously changed so that the product WX and the ratio X/w remain constant. The latter dimensionless ratio is commonly referred to as the "number of spots" provided by the acousto-optic deflector. The constancy of the product WX is a consequence of the electromagnetic field satisfying Laplace's equation, and is independent of the means used for deflecting the laser beam. It is easy to take advantage of this effect in the case of acousto-optic deflection because the angle of deflection is so small that a simple variable beam expander may be placed after the acousto-optic deflector.

Increasing the dimension X increases throughput because it becomes less likely that, at any given instant, an X by X area will not contain a location at which a laser-produced crater is needed. From another viewpoint, the X by X "AOD field" is the area within which one may regard beam positioning speed as being infinite.

In a conventional laser marker one could increase throughput when W is decreased by simultaneously decreasing the diameter of the galvo mirrors. This is not done in practice because the mirrors are rigidly attached to the galvos. Throughput could also be increased in a conventional laser marker by changing the objective lens to one with a longer focal length, thereby requiring less angular deflection by the galvanometers for a given distance on the workpiece. However galvos and objective lenses are expensive and cumbersome in comparison with the lenses 112 through 116 used in this invention.

In this embodiment, changing beam diameter W is implemented by selecting a different lens from among the lenses 112, 113, 114, 115, and 116. FIG. 4 shows a turret 20 for doing this. The turret ensures that the distances between lens 111 and each of the lenses 112 through 116 is as specified in Table 1. Not shown in FIG. 4 are components for rotating the turret. Such components could be a motor, a drive belt, a detent, and a shaft encoder and their design into a complete mechanism would be a straightforward design task. Such a turret, for example, is included within the XRL laser memory repair systems.

III. Automatic Focus and Workpiece Location

In most applications of laser markers there is no need for automated focusing since workpieces have a known, constant thickness. However equipment capable of automatic focusing, such as the General Scanning LT1320A Dynamic Focus/Linear Translator, has been introduced for another purpose, the elimination of the high cost of an objective lens which can cover a large field. The LT1320A is a mechanism for moving a simple, small lens along its optical axis. It is intended to be placed prior to the galvanometers in the optical path, with no other optical elements following the galvanometers. When the driving signal for the LT1320A is properly synchronized with the driving signals for the galvanometers the focal surface can be made flat rather than spherical. The LT1320A can obviously also be used as the actuator required for implementing automatic focusing. The controlling means for the LT1320A can also be purchased from General Scanning, and it is essentially the same as that for controlling a galvo. One can postulate mechanisms other than the LT1320A, such as a zoom lens mechanism in which some lens elements move while others are stationary. In the case of a zoom lens the focal length, and not just the distance to the focal plane, is varied.

Automatic focusing requires not only an actuator but also a sensor for the height of the surface to be marked. Such a sensor is ideally a non-contact sensor. The acousto-optic deflectors in the present invention provide the capability of reducing the laser power hitting the workpiece to a low level, so that it will not damage the workpiece but will provide a strong signal to a photodetector viewing laser light reflected from the workpiece. As the laser beam is scanned across edges on the workpiece the rate of variation of reflected light intensity is a sensitive indicator of the quality of focus. This method for focusing is now used extensively in laser resistor trimmers and laser memory repair systems. The method was originally introduced for the purpose of locating the workpieces, hybrid circuits and integrated circuits, to greater accuracy than parts handlers could achieve.

Locating workpieces with more accuracy than that provided by parts handlers is usually not a requirement for laser markers, however laser marking on state of the art integrated circuit packages may require this improved capability. Another application for sensing the location of workpieces is detecting the occasional workpiece which is misplaced in its carrier or is missing. There are non-marking applications, such as drilling of vias in multichip modules and repairing of printed circuit boards, where this improved ability to locate the workpiece is also important.

There has been reluctance to use the LT1320A as a means for replacing flat field lenses, partly because the LT1320A is somewhat slower than the galvos used for aiming the laser beam. When moving the laser beam between widely different parts of the field one would be frustrated by the slowness of the LT1320A. However when one uses this invention for laser marking one understands that high speed is only important for throughput when the small motions within characters are considered. Speed in motion over large distances, such as is provided by the galvos is less important, and so is the slower speed of the LT1320A.

IV. Controlling Electronics

Figure 6:
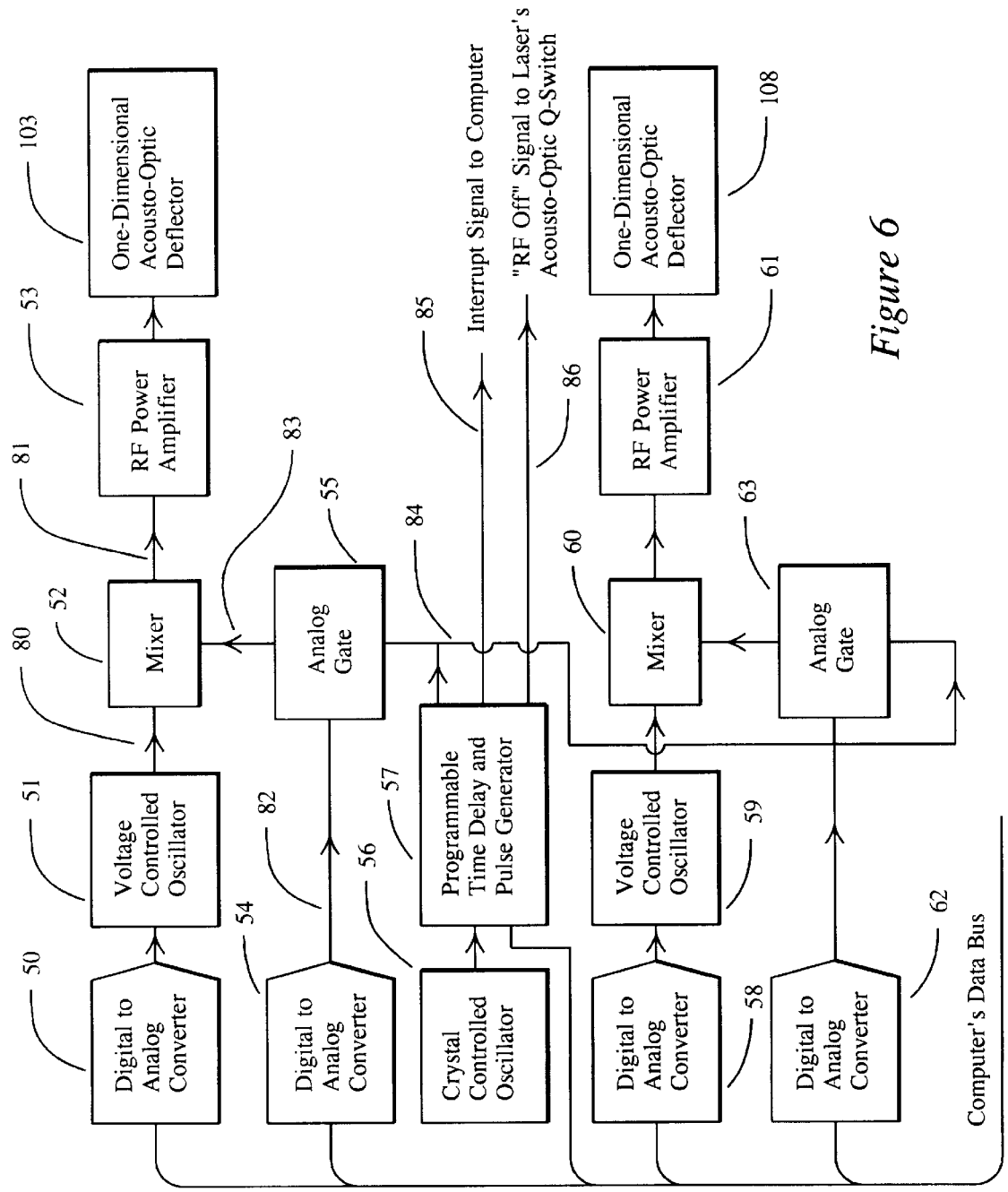
FIG. 6 is a block diagram of the electronics for controlling the acousto-optic deflector, the laser, and the computer interrupts.
Figure 7:
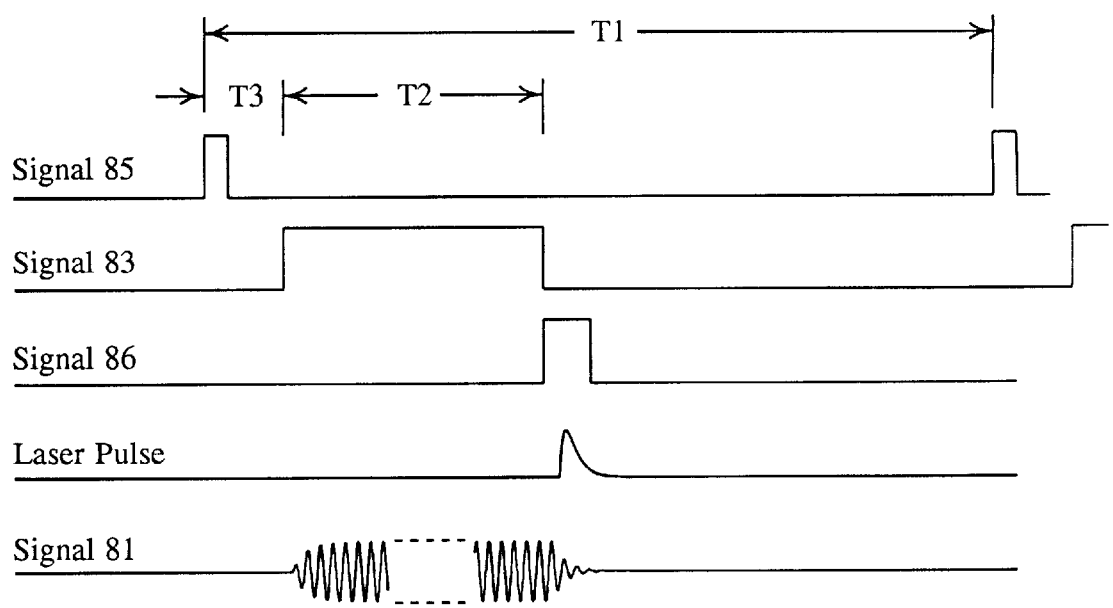
FIG. 7 shows voltage waveforms called out in FIG. 6.

A block diagram of the electronics for controlling the acousto-optic deflectors (AODs), laser pulse generation, and the timing of system operation is shown in FIG. 6. The time behavior of certain critical signals indicated in FIG. 6 is shown in FIG. 7. Components 58 through 63, which serve one deflection axis, are identical to components 50 through 55, which serve the other axis. In the case that a monolithic two-dimensional acousto-optic deflector 30 is used the designations of the two one-dimensional acousto-optic deflectors, 103 and 108, are replaced by designating the two acoustic transducers on the two-dimensional deflector.

Digital to analog converter (DAC) 50 controls the frequency of the voltage controlled oscillator (VCO) 51. The VCO's output, Signal 80, has a power level of a few milliwatts. In the case of a $TeO_2$ deflector the VCO's frequency range is 25 to 45 MHz and a Mini-Circuits ZOS-50 VCO is used. In the case of a $PbMoO_4$ AOD the VCO's frequency range is 70 to 90 MHz and a Mini-Circuits ZOS-100 VCO is used. The mixer 52 is used for two purposes: (a) to provide computer control over RF power level, and therefore computer compensation for the variation in efficiency with deflection angle of the AOD, and (b) to limit power dissipation in the acoustic transducer, by providing power to the transducer only when necessary. RF power is applied to the transducer for a time T2, shown in FIG. 7, which is less than time T1, the time between laser pulses. T1, in the embodiment described here, is 33.3 microseconds or greater, and T2 is 13.5 microseconds in the case of a $TeO_2$ AOD and 2.5 microseconds in the case of a $PbMoO_4$ AOD. These values of T2 are the times required to produce an acoustic column whose length is 1.5 laser beam diameters, or 9 millimeters. Both the interval T1 between laser pulses and the interval T2 are produced under computer control by the programmable time delay and pulse generator 57 whose implementation is a straightforward circuit design task. At the end of interval T2 this generator produces signal 86, the "RF Off" signal to the laser's acousto-optic q-switch which results in the production of a laser pulse. Prior to interval T2 the generator produces signal 85, which generates a computer interrupt and thereby initiates the interrupt handler software described later and shown in FIG. 14.

The delay T3 between signal 83 and signal 85, shown in FIG. 7, is a few microseconds and is provided to allow the computer software to load values into the DACs in FIG. 6, and for the outputs of the DACs and the VCOs to settle.

Signal 84 in FIG. 6 has the same time duration as signal 83, shown in FIGS. 6 and 7. The amplitude of signal 84 is constant, while the amplitudes of signals 81 and 83 are proportional to the voltage 82 produced by DAC 54. The analog gate 55, which produces this effect can be implemented straighforwardly with either a diode bridge or a junction FET, both with appropriate biasing circuitry.

The mixers 52 and 60 are a Mini-Circuits SBL-1-1LH mixers and the RF power amplifiers 53 and 61 are either Mini-Circuits ZHL-1-2W or Mini-Circuits ZHL-5W-1 linear, broadband power amplifiers. Not shown in the figure are optional components such as directional couplers and rectifiers which allow the computer to measure the RF power levels out of the RF power amplifiers and the power level of the RF reflected from the AODs. Components 52, 54, 55, 60, 62, and 63 are also optional in that one could do without them, giving up a few advantages of this embodiment, but still achieve the main advantage of this invention, the great increase in marking speed provided by use of the AODs.

The choice of DACs 50, 54, 58, and 62 is not critical. Eight bit DACs are adequate for DACs 54 and 62. Twelve bit DACs such as the Analog Devices AD566AJD would be preferable for DACs 50 and 58 so that no effect of the finite resolution of the DAC would be seen in the shape of marked characters.

V. Computer Software i. General

The computer program for marking, m3, contains many non-new, non-inventive components. The new and difficult component is an interrupt handler which is executed once for each laser pulse, i.e., typically 30,000 times per second. During the 33.3 microseconds available between laser pulses the interrupt handler must:

(a) Output to digital to analog converters (DACs) the quantities: xao, yao, xrf, yrf, xgc, and ygc. The x and y acousto-optic deflector frequencies, and hence the deflection angles, are proportional to xao and yao. The RF power levels for the x and y acousto-optic deflectors (AODs) are proportional to xrf and yrf. The command voltages for the x and y galvo servos are proportional to xgc and ygc.

(b) Calculate values for xao through ygc to be used during the next interrupt.

(c) Test whether the values of xao and yao imply that the location to be marked during the next interrupt will be within the field of the acousto-optic deflectors, the "AOD field."

(d) If not, set the AOD RF power levels to be used at the next interrupt at a level which causes negligible laser power to reach the workpiece. Also do not increment a pointer to the next location of a crater within a character.

(e) Calculate new values for distortions. This calculation can be spread out over several interrupts, as described below.

(f) If the values of xao and yao are within the AOD field, then update pointers to coordinate pairs within fonts, or, if at the end of a character, update the pointer to the characters to be marked.

(g) Handle motion between successive lines of text.

There is no mention of laser pulse generation within the interrupt handler, for the following reason:

The laser pulse is generated approximately T4=T2+T3=5 to 15 microseconds after the computer interrupt, allowing sufficient time for sound waves of the proper frequency and intensity to fill the active regions of the AODs. T2 and T3 are indicated in FIG. 7. The T4 delay is achieved by the programmable time delay and pulse generator 57, shown in FIG. 6, rather than by software. Similarly RF power is applied to the AODs only for the time interval T2, also generated by the programmable time delay and pulse generator 57, so no reference to gating of RF power is seen in the software.

The degree of difficulty in accomplishing tasks (a) through (g) above in less than 33.3 microseconds depends upon computer speed and efficiency of the programming language used. The program to be described runs in a 120 MHz Intel Pentium processor and is compiled with the Borland Turbo C compiler.

The above description applies to a broad range of laser marking applications addressed by this invention. In order that the program may be comprehensible, it treats the following specialized situation: Multiple lines of text are marked with a single font, constant size of characters, and constant spacing between lines. The lines are left justified, with ragged right edges. The heights of the characters are smaller than the 4 millimeter height of the AOD field.

Extension from this specialized situation could be done as follows. The text to be marked, like text used with word processors, would contain embedded information about fonts and locations of characters. The routine which reads the text would interpret this embedded information and generate tables indicating the font to be used for each character and the starting and ending locations of lines of text. Information in these tables would be used by the interrupt handler in place of the fixed information it presently uses.

The routine which reads the text presently calculates one scanning speed. It could instead calculate the scanning speed averaged over one galvo time constant and store that in a table. The interrupt handler would achieve higher throughput by using the varying, tabulated speed rather than one constant speed.

In order to understand the code for the interrupt handler it is necessary to understand other routines which accomplish the following tasks, listed in the order in which they are executed:

1. Generation of distortion tables, performed by a separate program, dis3m.c, listed in the microfiche appendix.

2. Conversion from ordinary metric units to units appropriate for fast calculations within the interrupt handler. This is done in the routine marksetup. This routine also does other calculations which can be done before the interrupt handler is brought into use.

3. Reading the text to be marked, calculating the maximum speed for the galvo scan, and collecting useful statistical data. This is done in the routine readtext.

4. Initializing variables used in the interrupt handler. This is done in the routine initihan, listed in the microfiche appendix.

The interrupt handler itself, ihandler, is listed in the microfiche appendix.

The straightforward functions omitted from the description are:

(a) Generating fonts, performed by a separate program named fonta (b) Memory allocation for fonts and distortion correction tables (c) Reading files containing fonts and distortion correction tables (d) Inputting user parameters and checking their values for validity (e) Error checking in general (f) Diagnostic printouts (g) Performance calculations (h) Time measurements The interrupt handler is written in the C language, which is intended to be easy to read and understand. Much of the explanation required is contained in comments which describe the meaning of each variable. However the topics of distortions, coordinate definitions, coordinate units, transient motion simulation, fonts, and approximations require the following more detailed explanations:

ii. Distortions

In the descriptions which follow, the word "distortions" is shorthand for the sum of the following effects:

(a) Lens distortion, represented by a fifth order polynomial in the lens field angle, (b) Nonlinearity in the galvos' feedback transducers, represented as fifth order polynomials in the galvo shaft angles, (c) Imperfect orthogonality between the x and y galvo axes, (d) The unsymmetric pincushion distortion which results when a ray of light is reflected first from one rotating mirror and then from another at right angles to the first.

(e) Change in size of the AOD field as one moves over the galvo field.

The following effects are neglected since their effects have been found to be negligibly small in this application:

(f) Imperfect orthogonality between x and y AOD axes.

(g) Imperfect parallelism between AOD and galvo axes.

(h) Nonlinear relationship between acousto-optic deflection angle and the numbers sent to the DACs which set the RF frequencies for the AODs.

(i) Angular distortion within the AOD field.

The variables which contain the above distortion information are named xdist and ydist. The x distortion, xdist, is defined by xdist=xg−xga. When the x galvo is at rest xg is proportional to the voltage sent to the galvo's servo. When in motion, xg, the "actual" galvo position, differs from the commanded position, xgc, by the quantity xtrans, for "transient." If the galvo were at rest and its command voltage were incremented by an amount V, then xgc would be proportional to V, xtrans proportional to V(1−exp(−t/tau)), and xg proportional to Vexp(−t/tau), where t is time and tau is a time constant. The "absolute" coordinate, xga, is the desired position of the laser beam on the workpiece.

iii. Transient Motion Simulation

When the time between interrupts, dtint, is small compared with the time constant of the x and y galvo servos, xtau and ytau, and when constant amounts are added to xgc and ygc per interrupt, the galvos move at nearly constant speed, and their actual positions, xg and yg, lag behind their commanded positions, xgc and ygc, by distances dxlag=xtau times the x speed and dylag=ytau times the y speed.

The next higher level of approximation deals with the situation in which speed is almost, but not quite, constant, while scanning a line of text, and in which one slews from one line of text to the next. In the time between two successive interrupts the quantity xtrans=xgc−xg will decrease to xtrans times exp(−dtint/xtau). Then, at the time of the second of these interrupts xgc will be incremented by an amount vxdt and xtrans will be simultaneously decremented by vxdt so that the actual position xg suffers no discontinuity. At each interrupt the program recalculates xtrans with xtrans=xtrans times exp(−dtint/xtau)−vxdt, so the program always knows the actual x galvo position xg to an adequate approximation without having to actually measure xg. A similar statement for yg, ygc, and ytrans applies to the y galvo.

Rather than, or in addition to, calculating xg and yg as described above, one may measure the galvo positions as indicated by their position feedback transducers. Calculating xg and yg, however, has several advantages, as follows:

(a) One may simulate marking by using a conventional laser printer rather than galvos, AODs, and a high power laser, (b) One may easily understand the effects of changing the time constants xtau and ytau, (c) One does not have to be concerned about the fidelity of the position feedback transducers and their supporting electronics.

Such a motion simulation is not required for the x and y AOD coordinates, xao and yao, since the AODs may be treated as responding instantly to xao and yao.

iv. Coordinate Units and Ranges

The coordinates xga, yga, xg, yg, xgc, and ygc, are integers between 0 and $2^{30}$. The coordinates xgc and ygc are shifted right 14 bits, i.e., divided by $2^{14}$, before sending them to 16-bit DACs. The full range of xa through ygc correspond to the desired marking field, 300 millimeters, plus at least twice the largest value of xdist or ydist. Having their ranges be larger than 300 millimeters is necessary so that there is no chance of them exceeding the range of 0 to 230 during the process of correcting for distortions.

The coordinate xao, sent to a 12-bit DAC for controlling the frequency sent to the x AOD, is such that the range from xaodacmin to xaodacmax corresponds to the 4 millimeter width of the AOD field. Similarly yao controls the y AOD and the range from yaodacmin to yaodacmax corresponds to the 4 millimeter height of the AOD field.

v. Coordinates in Font Tables

The arrays font1 and font2 are arrays of x-y coordinate pairs specifying the locations of craters within each character. The coordinates in font1 and font2 are normalized so that the height of a numeral or capital letter is 16384. The width of each character includes empty space on either side in order to provide space between characters. The coordinates in font1 and font2 are proportional to the coordinates in the file ROMANS.SHX distributed with the computer aided design program AutoCAD. The arrays font1 and font2 differ only in that the crater locations in font1 are sorted approximately from left to right and the locations in font2 are sorted approximately from right to left.

vi. Approximations

Making approximations is essential to reducing the execution time of the interrupt handler. The approximations also contribute to making the program hard to understand, so the approximations used in addition to those described above, are enumerated as follows:

(a) The quantities xtrans and ytrans vary negligibly over the time between 5 interrupts and the distortions xdist and ydist vary negligibly over the distance corresponding to the size of a character. Therefore they are updated only once per 5 interrupts and the calculations for them are done in five approximately equal pieces, one piece per interrupt.

(b) The variation over the field of the x and y distortions, xdist and ydist, is small enough that xdist and ydist may be calculated by two-dimensional, bilinear interpolation in a 2 by 128 by 128 table, ctab. The program, dis3m, which generates ctab is listed in the attached microfiche appendix.

(c) The variation in size of the AOD field is small enough that one may use 32 by 32 tables of the parameters, xaogalva, yaogalva, xxaogain, and yyaogain, that describe the AOD field size. The respective tables are named xaogal, yaogal, xxaogo, and yyaoga. Interpolation is not required. The program, dis3m, listed in FIG. 10, generates these tables.

vii. Sequence of Operations Within the Interrupt Handler

The detailed operation of the interrupt handler, ihandler, is shown in the attached microfiche appendix, and is as follows: First, new values are output to DACs. They, the transient motion simulation is done. These steps must be executed for every interrupt. They control branches to location eoldispatch if the galvos are in the process of moving from one line of text to the next. The next steps must be executed during each interrupt when in the midst of scanning each line of text. The x and y AOD deflections xao and yao are calculated first when scanning from left to right, and then when scanning from right to left. In those sections of code the value of xao is tested to see if the desired location has not yet entered the AOD field, or if the AOD field has passed beyond it. In either case the flag skipflag is set nonzero, but in the latter case the flag missflag is set nonzero. If missflag is nonzero, indicating an irreversible error, the program will move on to the next coordinate pair. Moving to the next coordinate pair is done later when the pointer to the font's coordinates, fdex, is incremented by 2, and the counter of coordinate pairs within a character, jdot, is incremented by 1.

If xao has been found to be in the range between xaodacmin and xaodacmax, i.e., the x AOD coordinate is within the x AOD's field, the y AOD coordinate, yao, is tested. The flags missflag and skipflag are both incremented if yao is not within the range yaodacmin to yaodacmax.

If skipflag has not been set nonzero the RF power levels are set to compensate for the variation in diffraction efficiency over the AOD field. If instead skipflag is nonzero the RF power levels are set to xrfoff and yrfoff, levels at which negligible laser power will reach the workpiece.

Next, the routine tests whether marking of a character has been completed, and if it has been completed are done, the following steps are executed. The pointer to characters to be marked, jtext, is incremented if scanning from left to right and decremented if scanning from right to left. The x galvo coordinate of the origin of the character to be marked, xchorg, is incremented by the width, xincrem, of the character just marked when scanning from left to right. The corresponding change in xchorg for scanning from right to left is deferred to a later point because the width to be used in that case is the width of the next character to be marked. The next character to be marked, charac, is gotten from the text buffer tetbuf. The pointer to xy coordinate pairs in either of the font tables, font1 or font2, is initialized to the first coordinate pair in the character.

The next character is tested for being the character which flags the end of each line of text. If the end of a line is found phase is set to 20. At the next interrupt execution will branch to eoldispatch, and the following steps will not be executed.

The next character is tested for being zero. Zero flags the end of text in the text buffer, signifying that the marking task is done. In this case the flag doneflag is set nonzero. If doneflag is nonzero the interrupt handler will execute essentially no code when it is subsequently entered. Background routines may sense doneflag's becoming nonzero in order to insert a new part to be marked into the galvo field, read new text to be marked, etc.

Some characters, such as a space, have no xy coordinate pairs to be marked, and have the variable ndots=0 to indicate this. When such a character is found, the program branches back to getnexchar to get another character.

The counter of coordinate pairs within a character, jdot, is initialized to zero. This completes handling of characters within a line, and the code which follows, deals with distortion corrections.

The distortion correction calculations are spread out over 5 interrupts by splitting the calculation into 5 portions, or phases. After each portion is complete the variable named phase is incremented so that the next portion is performed during the next interrupt. When phase=1, the steps which calculates indexes to the distortion table ctab, is executed. When phase=2 the x distortion, xdist, is calculated by bilinear, 2-dimensional, interpolation between four entries in ctab. When phase=3 the step which calculates the y distortion, ydist, is executed. When phase=4 the increments to be added to xgc and ygc during each interrupt, vxdt and vydt, are calculated. Also indexes to the 32 by 32 tables of AOD coordinate corrections, jaox, jaoy, and jaoxy, are calculated. When phase=5 these indexes are used to look up the AOD coordinate corrections. No interpolation is done. Phase is then returned to 1, so the cycle of distortion correction calculations will be repeated as long as the scan within a line of text continues.

The cycle is broken at the end of a line of text, when phase is set to 20, but distortion corrections are unimportant during the delay when slewing from one line to the next.

Updated values of xdist, ydist, vxdt, vydat, and xaogalva through yaocenter are made available to the code at different times, but this lack of synchronism is quantitatively unimportant. The calculations could have been spread out over a larger number of interrupts, such as 10 interrupts, with no significant effect.

When the end of a line of text is detected, and phase is set to 20 the step starting at eoldispatch, is executed. The first task is to set the AOD RF levels to xrfoff and yrfoff, so that no laser power will reach the workpiece. The next task is to find the end of the next line. When scanning from left to right the next line will be scanned from right to left. Since lines are left justified, and ragged on the right, it is necessary to measure the length of the next line only when the current scan direction is left to right. The length of the next line, xa, is calculated next. The tasks performed when phase=20 could take longer than 33 microseconds, so the next line is scanned 5 characters at a time. Phase is increased to 21 only when the end of the next line is found. When this occurs the pointer to the next character to be marked, jtext, has been correctly set, the pointer to the fonts, fdex, is initialized, and phase is set to 21.

When phase=21 the next step is executed. The absolute locations for the start of the next scan, xga and yga, are calculated and the variable goright is changed from 1 to 0 or from 0 to 1. The value of xga includes a distance xextra which is provided for the x galvo to get up to speed. This is provided because the approximations in the algorithm for xtrans are poor during large changes in speed. Next follows preparation for tasks to be done during the next interrupt, when phase=22.

When phase=22 crude values for xdist and ydist are calculated and used to calculate commanded galvo positions, xgc and ygc, for the start of the next scan. Crude values are adequate because more accurate values will be calculated during the time spent traversing the distance xextra. Next, values for xtrans and ytrans appropriate for the large motion between the end of one scan and the beginning of the next are calculated. Next, a counter, delayctr, is initialized to the value, ndelayl, which was calculated in routine marksetup to be a small number of x galvo time constants divided by the time between interrupts.

When phase=23 the next step is executed for a number of interrupts equal to initial value of delayctr. Then phase is set to 1 and vxdt is initialized to a crude value which is adequate for starting the scanning motion generated. A more accurate value for vxdt will be calculated later, at the same time as more accurate values for xdist and ydist are calculated. This completes the preparations for the interrupt handler's executing the code for phases 1 through 5 at the beginning of the next line of text.

VI. Terms Used in the Claims

General terms used in the claims, such as "substantially afocal optical element", if used consistently within the description, would have made the description hard to read. Therefore, it may not be clear exactly what elements in the description correspond to the general terms in the claims. The following description is intended to eliminate this problem.

The objective lens 10 is an example of the focusing means of claims 1 and 14.

The right angle prisms 128 and 130 are examples of the mirror means of claims 3, 4, 16, and 17. They are not to be confused with the moveable mirror means of claims 1 and 14 or mirrors 3 and 4 in FIG. 1.

The galvos 7 and 9, and their associated mirrors 6 and 8, combined together, are an example of the moveable mirror means of claims 1 and 14. Other examples include:

(a) A mirror mounted in a gimbal, with two torque motors attached to the gimbal, each rotating the mirror about a different axis, (b) A mirror with three or four linear actuators connected to its back side, such as is shown in U.S. Pat. No. 5,110,195

(c) A mirror which translates as well as rotates, such as is shown in U.S. Pat. No. 5,268,554, and (d) means in which an axis of shaft rotation is not perpendicular to the normal to the plane of its associated mirror.

Figure 5:
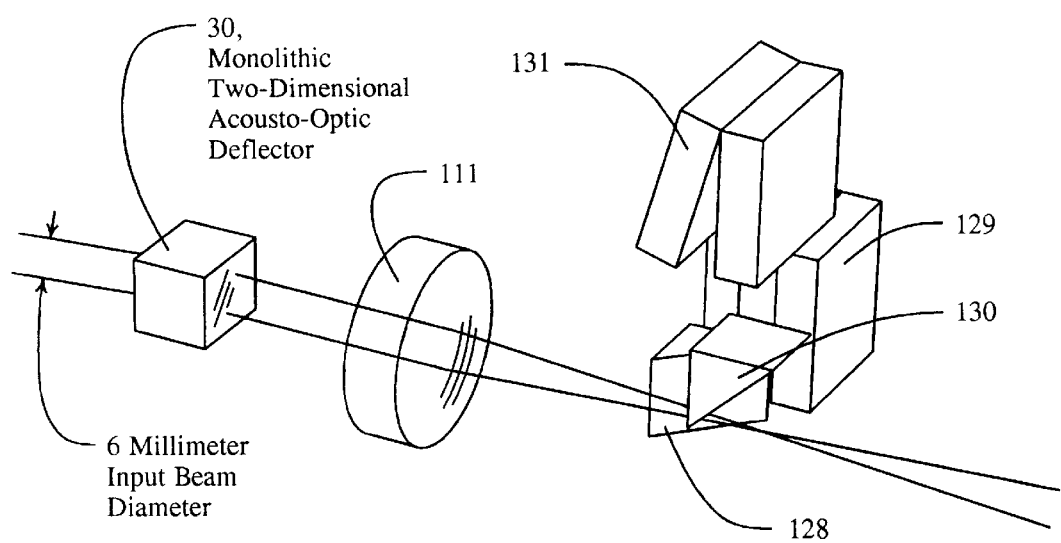
FIG. 5 shows a monolithic two-dimensional acousto-optic deflector, an alternative to the elements shown in FIG. 3.

Examples of the two-dimensional acousto-optic deflector 5, shown in FIG. 1, and referred to in claims 1 and 14, are:

(a) the pair of one-dimensional acousto-optic deflectors 103 and 108, shown in FIGS. 3 and 6, and associated optical elements 101, 102, 104, 105, 106, 107, 109, and 110 shown in FIG. 3, (b) the monolithic two-dimensional acousto-optic deflector 30, shown in FIG. 5.

(c) two one-dimensional acousto-optic deflectors in series, but having sufficient height perpendicular to the planes containing sound propagation and laser beam propagation so as not to need the anamorphic optics described in this document Examples of the mirror means of claims 4 and 17 are:
(a) second right angle prism 130, shown in FIGS. 1, 3, and 4, and
(b) second right angle prism 130 plus first right angle prism 128 combined together as shown in FIG. 5.

An example of the first substantially afocal optical element of claims 9 and 22 is the first beam expander 2 shown in FIG. 1.

An example of the second substantially afocal optical element of claims 10 and 23 is lens 111 plus any one of lenses 112, 113, 114, 115 or 116, spaced as indicated in Table 1. These are also referred to as the second beam expander even though they may, in fact, decrease the diameter of the beam.

An example of the second substantially afocal optical element with variable magnification of claims 11 and 24 is lens 111 plus lenses 112 through 116 and a mechanism which alternately inserts one of the lenses 112, 113, 114, 115, or 116 in the beam path, each with its appropriate spacing from lens 111 as indicated in Table 1. These are also referred to as the second beam expander even though they may, in fact, decrease the diameter of the beam Examples of the controlling means for the two-dimensional acousto-optic deflector of claims 1, 8, 14, and 21 are the combination of the electronics described here and indicated in FIG. 6; the computer software described here and listed in FIGS. 10 through 26 in the microfiche appendix; a computer which may be shared with other functions of the laser marker; and electronics, software, operator terminals and communication links which are commonly known in the art.

I claim:

1. An improved apparatus for heating, melting, vaporizing, or cutting a workpiece, of the type which comprises:
    a laser generating a laser beam possessing sufficient energy per pulse to accomplish heating, melting, vaporizing or cutting of said workpiece;
    a moveable mirror assembly for deflecting said laser beam over said workpiece interposed in the laser beam following said laser;
    a lens focusing said laser beam on said workpiece, said lens interposed in the laser beam either before or after said moveable mirror assembly; and
    a controller controlling said moveable mirror assembly and said laser;
    wherein the improvement comprises:
    (a) a high diffraction efficiency two-dimensional acousto-optic deflector interposed in said laser beam following said laser and having an angular range of deflection smaller than that of said moveable mirror assembly, said two-dimensional acousto-optic deflector comprising
        first and second one dimensional acousto-optic deflectors arranged in series and oriented at substantially right angles to one another, and
        anamorphic optical elements which substantially focus said two-dimensional acousto-optic deflector on said moveable mirror assembly;
    (b) an absorber absorbing that fraction of laser light which is not diffracted by said two-dimensional acousto-optic deflector; and
    (c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit.

2. The apparatus of claim 1 wherein said anamorphic optical elements substantially focus said first one-dimensional acousto-optic deflector on said second one-dimensional acousto-optic deflector, and focus said second one-dimensional acousto-optic deflector on said moveable mirror assembly.

3. The apparatus of claim 1 wherein said two-dimensional acousto-optic deflector receives a radio-frequency (RF) signal, said signal being received only during a time that a laser pulse passes through the acousto-optic deflector.

4. The apparatus of claim 1 wherein said lens has variable focal length, and further comprises a focus controller.

5. The apparatus of claim 1 wherein said lens is moveable in the focus direction, and further comprises a focus controller.

6. The apparatus of claim 1 further comprising a substantially afocal optical element interposed in the laser beam between said laser and said two-dimensional acousto-optic deflector, in order to make a width of the laser beam substantially equal to a width of that volume within the acousto-optic deflector which is effective for deflection.

7. The apparatus of claim 1 further comprising a substantially afocal optical element interposed in the laser beam following said two-dimensional acousto-optic deflector.

8. The apparatus of claim 1 wherein said controller moves said moveable mirror assembly at substantially constant speed along a line of text while said two-dimensional acousto-optic deflector moves the laser beam so as to delineate individual characters.

9. The apparatus of claim 1 wherein a radio frequency power level to each dimension of said two-dimensional acousto-optic deflector is varied as a frequency, hence a deflection angle, is varied, so as to compensate for said two-dimensional acousto-optic deflector's variation in diffraction efficiency with deflection angle.

10. An improved apparatus for heating, melting, vaporizing, or cutting a workpiece, of the type which comprises:

a laser generating a laser beam possessing sufficient energy per pulse to accomplish heating, melting, vaporizing or cutting of said workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:

(a) a high diffraction efficiency two-dimensional acousto-optic deflector interposed in said laser beam following said laser and having an angular range of deflection smaller than that of said moveable mirror assembly, said two-dimensional acousto-optic deflector comprises
first and second one dimensional acousto-optic deflectors arranged in series and oriented at substantially right angles to one another, and
anamorphic optical elements which substantially focus said first one-dimensional acousto-optic deflector on said second one-dimensional acousto-optic deflector, and focus said second one-dimensional acousto-optic deflector on said moveable mirror assembly, said anamorphic optical elements are located between said first and second one-dimensional acousto-optic deflectors and comprise additional lenses for forming a real image of the laser, said real image being also located between the first and second said one-dimensional acousto-optic deflectors;

(b) an absorber absorbing that fraction of laser light which is not diffracted by said two-dimensional acousto-optic deflector, said absorber comprises a second mirror assembly interposed in an optical path near said real image, offset from a center line of the optical path so that it intercepts, and therefore eliminates, undiffracted light from said first one-dimensional acousto-optic deflector, but allows diffracted light to pass on to said second one-dimensional acousto-optic deflector; and (c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit.

11. An improved apparatus for heating, melting, vaporizing, or cutting a workpiece, of the type which comprises:

a laser generating a laser beam possessing sufficient energy per pulse to accomplish heating, melting, vaporizing or cutting of said workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:

(a) a high diffraction efficiency two-dimensional acousto-optic deflector interposed in said laser beam following said laser and having an angular range of deflection smaller than that of said moveable mirror assembly;

(b) an absorber absorbing that fraction of laser light which is not diffracted by said two-dimensional acousto-optic deflector comprising
a lens assembly forming a real image of the laser, said lens assembly and said real image being located between said two-dimensional acousto-optic deflector and said moveable mirror assembly, and
a second mirror assembly interposed in an optical path near said real image, offset from a center line of the optical path so that it intercepts, and therefore eliminates, undiffracted light from said two-dimensional acousto-optic deflector, but allows diffracted light to pass on to said moveable mirror assembly; and (c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit.

12. An improved apparatus for heating, melting, vaporizing, or cutting a workpiece, of the type which comprises:

a laser generating a laser beam possessing sufficient energy per pulse to accomplish heating, melting, vaporizing or cutting of said workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:

(a) a high diffraction efficiency two-dimensional acousto-optic deflector interposed in said laser beam following said laser and having an angular range of deflection smaller than that of said moveable mirror assembly;

(b) an absorber absorbing that fraction of laser light which is not diffracted by said two-dimensional acousto-optic deflector; and (c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit, said deflector controller comprising
electronics for generating and controlling frequencies and power levels provided to said two-dimensional acousto-optic deflector; and
a computer which generates sequences of control signals for said electronics, and provides real time control for:

decomposing a desired laser beam direction into x and y components due to said moveable mirror assembly and x and y components due to said two-dimensional acousto-optic deflector, compensating for the fact that said moveable mirror assembly does not respond immediately to its controlling signals, and compensating for distortion by said lens, nonlinearities of actuators or sensors of said moveable mirror assembly, non-orthogonality of deflector and mirror axes, and inherent pincushion distortion that occurs when two moveable mirrors are used.

13. An improved apparatus for heating, melting, vaporizing, or cutting a workpiece, of the type which comprises:

a laser generating a laser beam possessing sufficient energy per pulse to accomplish heating, melting, vaporizing or cutting of said workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:

(a) a high diffraction efficiency two-dimensional acousto-optic deflector interposed in said laser beam following said laser and having an angular range of deflection smaller than that of said moveable mirror assembly;

(b) an absorber absorbing that fraction of laser light which is not diffracted by said two-dimensional acousto-optic deflector;

(c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit; and (d) a substantially afocal optical element interposed in the laser beam following said two-dimensional acousto-optic deflector, said substantially afocal optical element has variable magnification and comprises a magnification controller for controlling the magnification of said substantially afocal optical element such that the laser beam's size at the workpiece is made variable, and simultaneously the ratio of the angular field covered by said two-dimensional acousto-optic deflector to the laser beam's size at the workpiece is kept substantially constant.

14. An improved apparatus for heating, melting, vaporizing, or cutting a workpiece, of the type which comprises:

a laser generating a laser beam possessing sufficient energy per pulse to accomplish heating, melting, vaporizing or cutting of said workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:

(a) a high diffraction efficiency two-dimensional acousto-optic deflector interposed in said laser beam following said laser and having an angular range of deflection smaller than that of said moveable mirror assembly;

(b) an absorber absorbing that fraction of laser light which is not diffracted by said two-dimensional acousto-optic deflector; and (c) a deflector controller controlling a deflection by said two-dimensional acousto-optic deflector, such that the laser beam can trace out individual characters, said deflector controller comprising a computer providing real time control for:

decomposing a desired laser beam direction into x and y components due to said moveable mirror assembly and x and y components due to said two-dimensional acousto-optic deflector, and compensating for the fact that said moveable mirror assembly does not respond immediately to its controlling signals.

15. An improved laser marker, of the type which comprises:

a laser producing a laser beam possessing sufficient energy per pulse to accomplish marking of a workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:

(a) a high diffraction efficiency two-dimensional acousto-optic deflector interposed in said laser beam following said laser and having an angular range of deflection smaller than that of said moveable mirror assembly, said two-dimensional acousto-optic deflector comprising first and second one dimensional acousto-optic deflectors arranged in series and oriented at substantially right angles to one another, and anamorphic optical elements which substantially focus said two-dimensional acousto-optic deflector on said moveable mirror assembly;

(b) an absorber absorbing that fraction of laser light which is not diffracted by said two-dimensional acousto-optic deflector; and (c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit.

16. The apparatus of claim 15 wherein said anamorphic optical elements substantially focus said first one-dimensional acousto-optic deflector on said second one-dimensional acousto-optic deflector, and focus said second one-dimensional acousto-optic deflector on said moveable mirror assembly.

17. The apparatus of claim 16 wherein said two-dimensional acousto-optic deflector receives a radio-frequency (RF) signal, said signal being received only during a time that a laser pulse passes through the acousto-optic deflector.

18. The apparatus of claim 15 wherein said lens has variable focal length, and further comprises a focus controller.

19. The apparatus of claim 15 wherein said lens is moveable in the focus direction, and further comprises a focus controller.

20. The apparatus of claim 15 further comprising a substantially afocal optical element interposed in the laser beam between said laser and said two-dimensional acousto-optic deflector, in order to make a width of the laser beam substantially equal to a width of that volume within the acousto-optic deflector which is effective for deflection.

21. The apparatus of claim 15 further comprising a substantially afocal optical element interposed in the laser beam following said two-dimensional acousto-optic deflector.

22. The apparatus of claim 15 wherein said controller moves said moveable mirror assembly at substantially constant speed along a line of text while said two-dimensional acousto-optic deflector moves the laser beam so as to delineate individual characters.

23. The apparatus of claim 15 wherein a radio frequency power level to each dimension of said two-dimensional acousto-optic deflector is varied as a frequency, hence a deflection angle, is varied, so as to compensate for said two-dimensional acousto-optic deflector's variation in diffraction efficiency with deflection angle.

24. An improved laser marker, of the type which comprises:

a laser producing a laser beam possessing sufficient energy per pulse to accomplish marking of a workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:

(a) a high diffraction efficiency two-dimensional acousto-optic deflector interposed in said laser beam following said laser and having an angular range of deflection smaller than that of said moveable mirror assembly, said two-dimensional acousto-optic deflector comprises first and second one dimensional acousto-optic deflectors arranged in series and oriented at substantially right angles to one another, and anamorphic optical elements which substantially focus said first one-dimensional acousto-optic deflector on said second one-dimensional acousto-optic deflector, and focus said second one-dimensional acousto-optic deflector on said moveable mirror assembly, said anamorphic optical elements are located between said first and second one-dimensional acousto-optic deflectors and comprise lenses for forming a real image of the laser, said real image being also located between the first and second said one-dimensional acousto-optic deflectors;

(b) an absorber absorbing that fraction of laser light which is not diffracted by said two-dimensional acousto-optic deflector, said absorber comprising a mirror assembly interposed in an optical path near said real image, offset from a center line of the optical path so that it intercepts and eliminates undiffracted light from said first one-dimensional acousto-optic deflector, and allows diffracted light to pass on to said second one-dimensional acousto-optic deflector; and (c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit.

25. An improved laser marker, of the type which comprises:

a laser producing a laser beam possessing sufficient energy per pulse to accomplish marking of a workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:

(a) a high diffraction efficiency two-dimensional acousto-optic deflector interposed in said laser beam following said laser and having an angular range of deflection smaller than that of said moveable mirror assembly;

(b) an absorber absorbing that fraction of laser light which is not diffracted by said two-dimensional acousto-optic deflector comprising a lens assembly forming a real image of the laser, said lens assembly and said real image being located between said two-dimensional acousto-optic deflector and said moveable mirror assembly, and a second mirror assembly interposed in an optical path near said real image, offset from a center line of the optical path so that it intercepts and eliminates undiffracted light from said two-dimensional acousto-optic deflector, and allows diffracted light to pass on to said moveable mirror assembly; and (c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit.

26. An improved laser marker, of the type which comprises:

a laser producing a laser beam possessing sufficient energy per pulse to accomplish marking of a workpiece;

a moveable mirror assembly for deflecting said laser beam over said workpiece interposed in the laser beam following said laser;

a lens focusing said laser beam on said workpiece, said lens interposed in the laser beam either before or after said moveable mirror assembly; and a controller controlling said moveable mirror assembly and said laser;

wherein the improvement comprises:
(a) a high diffraction efficiency two-dimensional acousto-optic deflector interposed in said laser beam following said laser and having an angular range of deflection smaller than that of said moveable mirror assembly;
(b) an absorber absorbing that fraction of laser light which is not diffracted by said two-dimensional acousto-optic deflector; and
(c) a deflector controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit, said deflector controller comprising
 electronics for generating and controlling frequencies and power levels provided to said two-dimensional acousto-optic deflector;
 a computer which generates sequences of control signals for said electronics, and provides real time control for:
  decomposing a desired laser beam direction into x and y components due to said moveable mirror assembly and x and y components due to said two-dimensional acousto-optic deflector,
  compensating for the fact that said moveable mirror assembly does not respond immediately to its controlling signals, and
  compensating for distortion by said lens, nonlinearities of actuators or sensors of said moveable mirror assembly, non-orthogonality of deflector and mirror axes, and inherent pincushion distortion that occurs when two moveable mirrors are used.

27. An improved laser marker, of the type which comprises:
a laser producing a laser beam possessing sufficient energy per pulse to accomplish marking of a workpiece;
a moveable mirror assembly for deflecting said laser beam over said workpiece interposed in the laser beam following said laser;
a lens focusing said laser beam on said workpiece, said lens interposed in the laser beam either before or after said moveable mirror assembly; and
a controller controlling said moveable mirror assembly and said laser;
wherein the improvement comprises:
(a) a high diffraction efficiency two-dimensional acousto-optic deflector interposed in said laser beam following said laser and having an angular range of deflection smaller than that of said moveable mirror assembly;
(b) an absorber absorbing that fraction of laser light which is not diffracted by said two-dimensional acousto-optic deflector;
(c) a deflection controller controlling a deflection by said two-dimensional acousto-optic deflector, such that the laser beam can be moved over a small angular range more rapidly than said moveable mirror assembly alone would permit, and over a larger angular range than said two-dimensional acousto-optic deflector alone would permit; and
(d) a substantially afocal optical element interposed in the laser beam following said two-dimensional acousto-optic deflector, said substantially afocal optical element has variable magnification, and comprises a magnification controller for controlling the magnification of said substantially afocal optical element such that the laser beam's size at the workpiece is made variable, and simultaneously the ratio of the angular field covered by said two-dimensional acousto-optic deflector to the laser beam's size at the workpiece is kept substantially constant.

28. An improved laser marker, of the type which comprises:
a laser producing a laser beam possessing sufficient energy per pulse to accomplish marking of a workpiece;
a moveable mirror assembly for deflecting said laser beam over said workpiece interposed in the laser beam following said laser;
a lens focusing said laser beam on said workpiece, said lens interposed in the laser beam either before or after said moveable mirror assembly; and
a controller controlling said moveable mirror assembly and said laser;
wherein the improvement comprises:
(a) a high diffraction efficiency two-dimensional acousto-optic deflector interposed in said laser beam following said laser and having an angular range of deflection smaller than that of said moveable mirror assembly;
(b) an absorber absorbing that fraction of laser light which is not diffracted by said two-dimensional acousto-optic deflector; and
(c) a deflector controller controlling a deflection by said two-dimensional acousto-optic deflector, such that the laser beam can trace out individual characters, said deflector controller comprising
a computer providing real time control for:
 decomposing a desired laser beam direction into x and y components due to said moveable mirror assembly and x and y components due to said two-dimensional acousto-optic deflector, and
 compensating for the fact that said moveable mirror assembly does not respond immediately to its controlling signals.

* * * * *